United States Patent
Lai et al.

(10) Patent No.: US 8,531,436 B2
(45) Date of Patent: Sep. 10, 2013

(54) SPECIFIC WAVELENGTH SELECTING METHOD FOR OPTICAL INPUT DEVICE AND OPTICAL INPUT DEVICE THEREOF

(75) Inventors: Chien Mo Lai, Taipei (TW); Tsu Nan Lee, Taipei (TW); Sheau Lin Li, Taipei (TW)

(73) Assignee: Kye Systems Corp., Taipei (TW)

( * ) Notice: Subject to any disclaimer, the term of this patent is extended or adjusted under 35 U.S.C. 154(b) by 327 days.

(21) Appl. No.: 12/654,222

(22) Filed: Dec. 15, 2009

(65) Prior Publication Data
US 2011/0090179 A1    Apr. 21, 2011

(30) Foreign Application Priority Data
Oct. 21, 2009  (TW) ................................ 98135677 A

(51) Int. Cl.
*G06F 3/033*    (2013.01)

(52) U.S. Cl.
USPC .......................................... 345/179; 345/166

(58) Field of Classification Search
USPC ................................. 345/179, 166
See application file for complete search history.

(56) References Cited

U.S. PATENT DOCUMENTS

| | | | | |
|---|---|---|---|---|
| 4,883,926 | A * | 11/1989 | Baldwin | 178/19.01 |
| 6,151,015 | A | 11/2000 | Badyal et al. | |
| 6,618,038 | B1 * | 9/2003 | Bohn | 345/164 |
| 2003/0075673 | A1 * | 4/2003 | Craven-Bartle | 250/216 |
| 2005/0035947 | A1 * | 2/2005 | Lutian | 345/166 |
| 2005/0190157 | A1 * | 9/2005 | Oliver et al. | 345/166 |
| 2005/0231465 | A1 * | 10/2005 | DePue et al. | 345/156 |
| 2005/0231482 | A1 * | 10/2005 | Theytaz et al. | 345/166 |
| 2006/0091298 | A1 * | 5/2006 | Xie et al. | 250/221 |
| 2007/0008286 | A1 * | 1/2007 | Theytaz et al. | 345/166 |
| 2007/0013661 | A1 * | 1/2007 | Theytaz et al. | 345/166 |
| 2007/0296699 | A1 * | 12/2007 | Bohn et al. | 345/166 |

FOREIGN PATENT DOCUMENTS
WO    WO2009096886    *    8/2009

* cited by examiner

*Primary Examiner* — Chanh Nguyen
*Assistant Examiner* — Robert Stone
(74) *Attorney, Agent, or Firm* — Bacon & Thomas, PLLC

(57) ABSTRACT

A specific wavelength selecting method for an optical input device includes the following steps. A light source for respectively emitting at least two light rays in different wavelength regions is first enabled. Next, the two light rays are projected to a working surface to obtain at least two corresponding reflected light rays. Then, optical signals of the reflected light rays are detected and compared to obtain a preferred optical result. Finally, a light ray in the most suitable wavelength region is selected and enabled according to the preferred optical result.

5 Claims, 9 Drawing Sheets

SPECIFIC WAVELENGTH SELECTING METHOD FOR OPTICAL INPUT DEVICE AND OPTICAL INPUT DEVICE THEREOF

CROSS-REFERENCE TO RELATED APPLICATIONS

This non-provisional application claims priority under 35 U.S.C. §119(a) on Patent Application No(s). 098135677 filed in Taiwan, R.O.C. on Oct. 21, 2009, the entire contents of which are hereby incorporated by reference.

BACKGROUND OF THE INVENTION

1. Field of Invention

The present invention relates to a peripheral input device, and more particularly to a specific wavelength selecting method for an optical input device and an optical input device thereof.

2. Related Art

In recent years, with the rapid development and progress of technologies, computer equipment such as a personal computer (PC) or a notebook has become an indispensable convenient tool in people's daily life or work. However, the computer equipment must be installed with a pointer input device such as a mouse, a touchpad, or a trackball to perform manipulations on a window interface of the computer equipment.

Taking an optical mouse as an example, currently, a common optical mouse in a hemispherical domelike structure is only limited to being used in a conventional manner. Actually, due to a large shape and volume of the optical mouse, a user still cannot operate the optical mouse like holding a pen, thereby resulting in a dead angle to a certain extent in use. The conventional optical mouse in a hemispherical domelike structure also causes a lot of inconveniences in use due to the structure and shape designs. In order to solve the above problems, manufacturers have already started to provide an optical mouse with a pen-like structure in the market, which is convenient for the user to hold the mouse in operation, and conforms to the ergonomic habit of holding a penholder.

As disclosed in U.S. Pat. No. 6,151,015, in a pen-like optical mouse as a computer-aided input device, a light-emitting diode (LED) or a laser diode and an optical sensor are disposed inside a pen-like shell. The LED emits and projects light rays on a working surface. The optical sensor is then used to sense changes of light rays refracted back from the working surface and perform imaging, so as to generate a corresponding cursor movement signal and transmit the cursor movement signal to the computer equipment. When the pen-like optical mouse moves, its moving track is recorded as a group of consecutive pictures photographed at a high speed. Finally, an interface microprocessor inside the optical mouse is used to perform analysis and processing on the photographed pictures. Thus, a moving direction and a moving distance of the mouse are determined by analyzing changes of positions of feature points in the pictures, so as to position the cursor.

However, regardless of a hemispherical optical mouse or a pen-like optical mouse, due to the volume restriction, only a single optical sensor and a single LED can be disposed inside the mouse, and the LED can only emit light rays at a single wavelength, thereby causing various limitations on the use of the optical mouse. That is to say, the conventional optical mouse must be very close to a working surface, or even attached to the working surface, such that the requirement on the flatness of the working surface used together with the optical mouse is rather high, so as to ensure the cursor to be positioned successfully.

If the user makes the optical mouse generate up and down movements in the operation process to result in an excessively large distance away from the working surface, or the flatness of the working surface is rather poor, the optical signals represented by the reflected light rays generated after the LED emits the light rays onto the working surface are changed, such that confusion occurs when the optical sensor reads the optical signals, thereby causing a low contrast of the images sensed by the optical sensor, or even causing a situation that the cursor fails to be accurately positioned.

SUMMARY OF THE INVENTION

In view of the above problems, the present invention is a specific wavelength selecting method for an optical input device and an optical input device thereof, which are applicable to solve problems that a conventional optical mouse has to be attached to a working surface in use and causes various usage restrictions, and the confusion occurs when an optical sensor reads optical signals due to an excessively long distance or an excessively large inclining angle between the optical mouse and the working surface, such that a cursor fails to be accurately positioned.

In a first embodiment, the present invention provides a specific wavelength selecting method for an optical input device, which includes the following steps. One end of the optical input device is disposed adjacent to a working surface. A multi-wavelength light source is provided, which is capable of respectively emitting at least two light rays in different wavelength regions corresponding to an optimal imaging position (distance) respectively. Next, the light rays in different wavelength regions are emitted to the working surface to obtain at least two corresponding reflected light rays respectively. Then, optical signals of the reflected light rays are detected and compared, so as to obtain a preferred optical result. Finally, the multi-wavelength light source is enabled to emit a light ray in a corresponding wavelength region continuously according to the preferred optical result, so as to obtain an optimal imaging position.

The optical input device according to the first embodiment of the present invention comprises a pen-like body, and a multi-wavelength light source, a light source sensing module, and a lens disposed in the pen-like body. The multi-wavelength light source respectively emits at least two light rays in different wavelength regions and emits the light rays to pass through the pen-like body to a working surface, such that the working surface generates at least two reflected light rays. The lens refracts the reflected light rays into the light source sensing module for being received.

When the pen-like body makes displacement relative to the working surface, the light source sensing module detects optical signals of the at least two reflected light rays, such that the multi-wavelength light source is enabled to continuously emit a light ray according to a distance between the pen-like body (or the multi-wavelength light source) and the working surface. The light source sensing module receives the reflected light ray, so as to generate a control signal.

In a second embodiment, the present invention provides a specific wavelength selecting method for an optical input device, which includes the following steps. One end of the optical input device is disposed adjacent to a working surface. At least two light sources are first provided, which emit light rays in different wavelength regions corresponding to an optimal imaging position (distance) respectively. Next, at least two light rays in different wavelength regions are emitted to the working surface to obtain at least two corresponding reflected light rays respectively. Then, optical signals of the reflected light rays are detected and compared, so as to obtain a preferred optical result. Finally, according to the preferred optical result, a light source corresponding to the wavelength region is selected to be continuously enabled.

The optical input device according to the second embodiment of the present invention comprises a pen-like body, and at least two light sources, a light source sensing module, and a lens disposed in the pen-like body. The at least two light sources emit light rays in different wavelength regions respectively, and each of the light sources emits a light ray to pass through the pen-like body to a working surface, such that the working surface generates at least two reflected light rays, and the lens refracts the reflected light rays into the light source sensing module for being received.

When the pen-like body makes displacement relative to the working surface, the light source sensing module detects optical signals of the at least two reflected light rays, and enables a light source corresponding to the wavelength region selectively according to a distance between the pen-like body (or the light source) and the working surface. The light source sensing module receives the reflected light ray, so as to generate a control signal.

The multi-wavelength light source of the present invention respectively emits light rays in different wavelength regions, or at least two light sources for emitting light rays in different wavelength regions are used, and then the light source sensing module detects optical signals generated by the light rays, so as to control the multi-wavelength light source/light source to continuously emit a light ray in the most suitable wavelength region. When the optical input device makes displacement relative to the working surface (such as vertical, horizontal, or inclining displacement), the multi-wavelength light source/light source may switch in real time to emit a light ray in a different wavelength region, so as to maintain an optimal sensing effect.

Therefore, the optical input device of the present invention can be successfully used on working surfaces with different surface conditions and used in situations of different distances between the optical input device and the working surface, which can cater to the swinging motions of a user in operation, such that the user is enabled to operate the optical input device at any place and any time without being restricted by the using environment.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
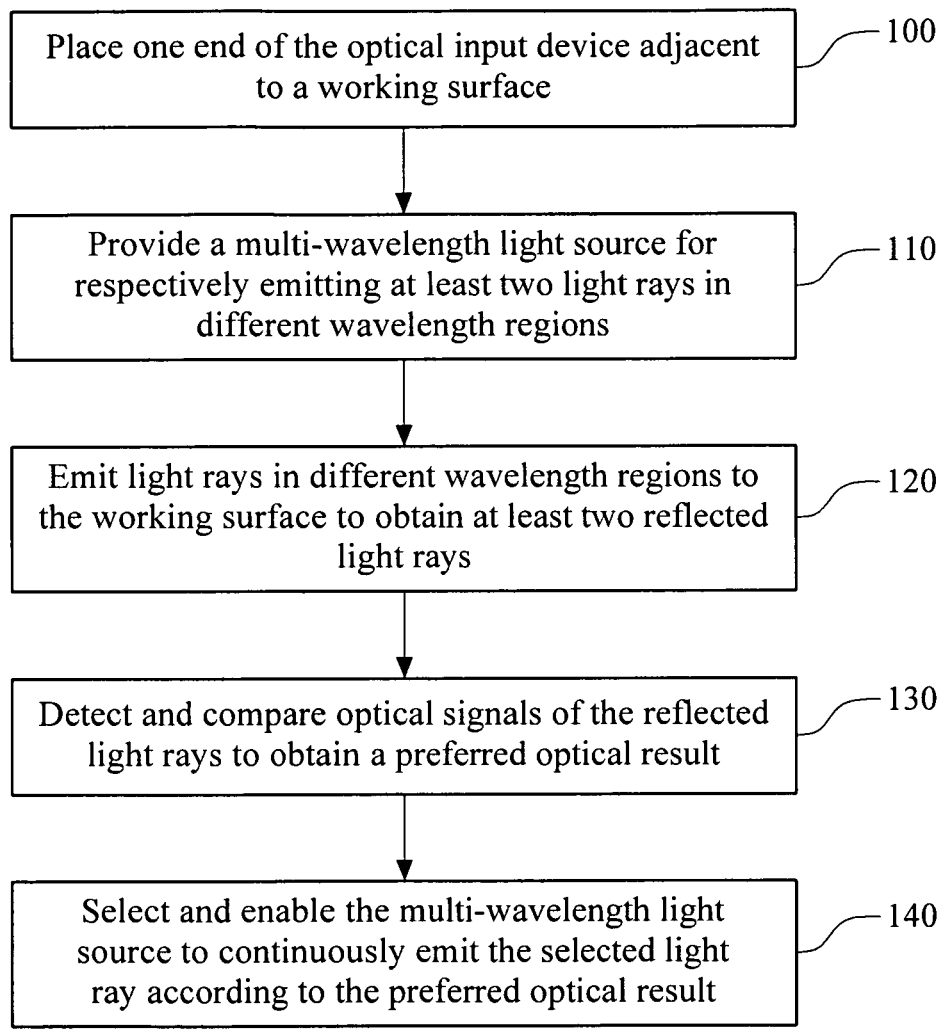
FIG. 1 is a flow chart of steps according to a first embodiment of the present invention.
Figure 2:
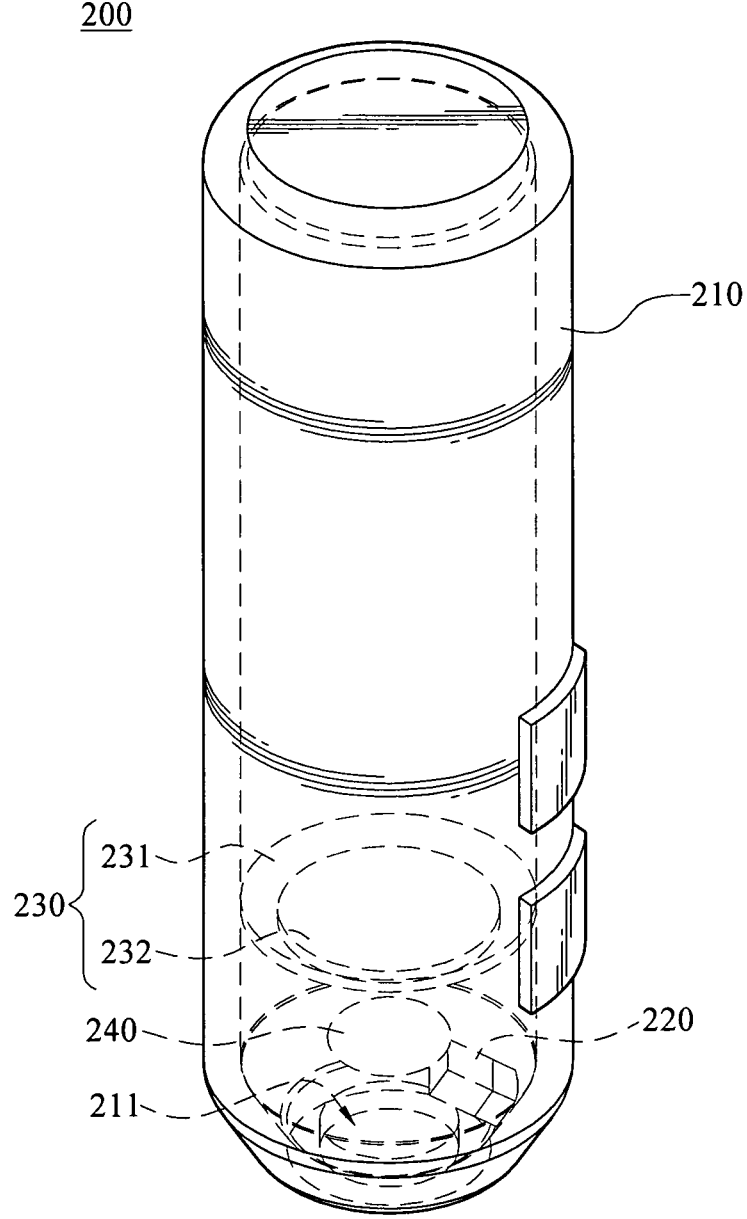
FIG. 2 is a schematic view according to the first embodiment of the present invention.
Figure 3A:
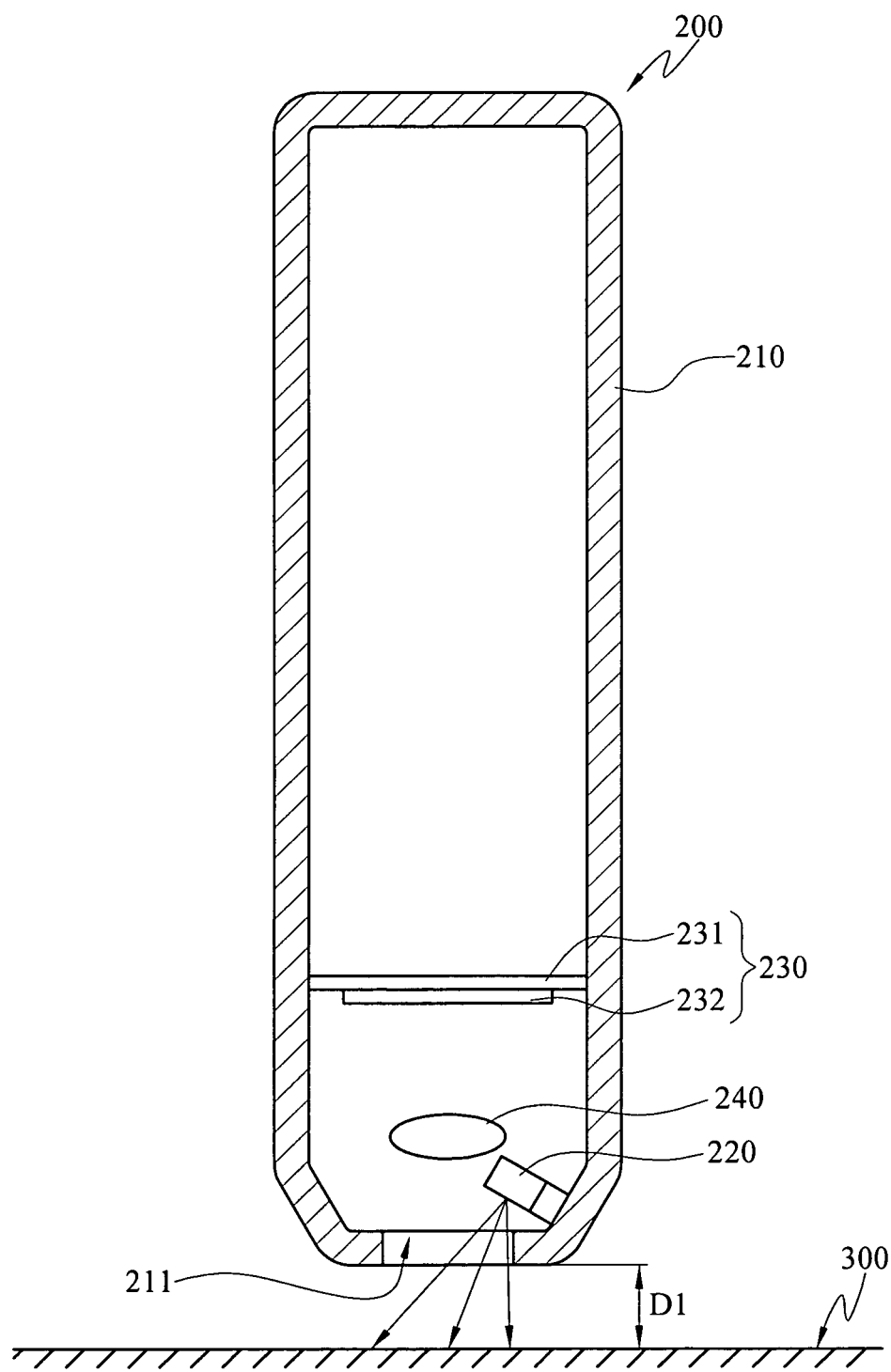
FIG. 3A is a schematic plan view according to the first embodiment of the present invention.

Referring to a flow chart of a first embodiment as shown in FIG. 1 and schematic views as shown in FIGS. 2 and 3A, a pen-like optical input device 200 according to a first embodiment of the present invention comprises a pen-like body 210, and a multi-wavelength light source 220, a light source sensing module 230, and a lens 240 disposed in the pen-like body 210. The pen-like body 210 is a hollow cylindrical structure, similar to a penholder shape. A light hole 211 is opened in a bottom surface of the pen-like body 210. The light source sensing module 230 comprises a circuit board 231 and an optical sensor 232. The optical sensor 232 is electrically disposed on the circuit board 231. Moreover, the multi-wavelength light source 220 emits light rays towards the light hole 211 of the pen-like body 210. The optical sensor 232 and the lens 240 are disposed at positions corresponding to the light hole 211. The lens 240 is located between the optical sensor 232 and the light hole 211.

The multi-wavelength light source 220 disclosed in the present invention may be a multi-wavelength light emitting diode (LED) or a similar light-emitting element, so as to emit light rays having directional characteristics. The optical sensor 232 may be a charged coupled device (CCD) or a complementary metal-oxide semiconductor (CMOS). However, the present invention is not limited to the disclosed embodiments.

In a specific wavelength selecting method for an optical input device according to the first embodiment of the present invention, one end of the pen-like optical input device 200 is placed adjacent to a working surface (Step 100). A multi-wavelength light source 220 is provided, in which the multi-wavelength light source 220 respectively emits at least two light rays in different wavelength regions (Step 110). Next, the multi-wavelength light source 220 emits light rays in different wavelength regions corresponding to an optimal imaging position (distance) respectively, and the light rays pass through the light hole 211 of the pen-like body 210 to the working surface 300 (for example, a desktop), such that the working surface 300 generates at least two corresponding reflected light rays respectively (Step 120). The pen-like body 210 can be suspended on the working surface 300 as FIG. 3A, but not limited to that. The pen-like body 210 also can be attacked to the working surface 300.

The reflected light rays enter the pen-like body 210 through the light hole 211 and are refracted by the lens 240 into the optical sensor 232 of the light source sensing module 230. The optical sensor 232 detects and determines optical signals represented by the reflected light rays, and makes comparison through a circuit system (not shown) in the pen-like optical input device 200, so as to obtain a preferred optical result (Step 130). According to the preferred optical result, the multi-wavelength light source 220 is enabled to continuously emit a selected light ray in a corresponding wavelength region (Step 140). The multi-wavelength light source 220 of the present invention increases the light intensity through focusing by the lens 240. The lens 240 disclosed in the present invention may be a lens of various configurations such as a double-convex lens, double-concave lens, or concave-convex lens. However, persons skilled in the art may select a lens with most preferred optical characteristics according to the practical using demands.

Specifically, when the pen-like optical input device 200 is operated in a manner of being vertical to the working surface 300 (as shown in FIG. 3A), the optical sensor 232 of the light source sensing module 230 detects and compares optical signals represented by the reflected light rays in different wavelength regions generated by the multi-wavelength light source 220, and determines a wavelength region that is most suitable for a distance between the pen-like body 210 (or the multi-wavelength light source 220) of the pen-like optical input device 200 and the working surface 300. Finally, the multi-wavelength light source 220 is enabled to continuously emit a light ray in the wavelength region.

Figure 3B:
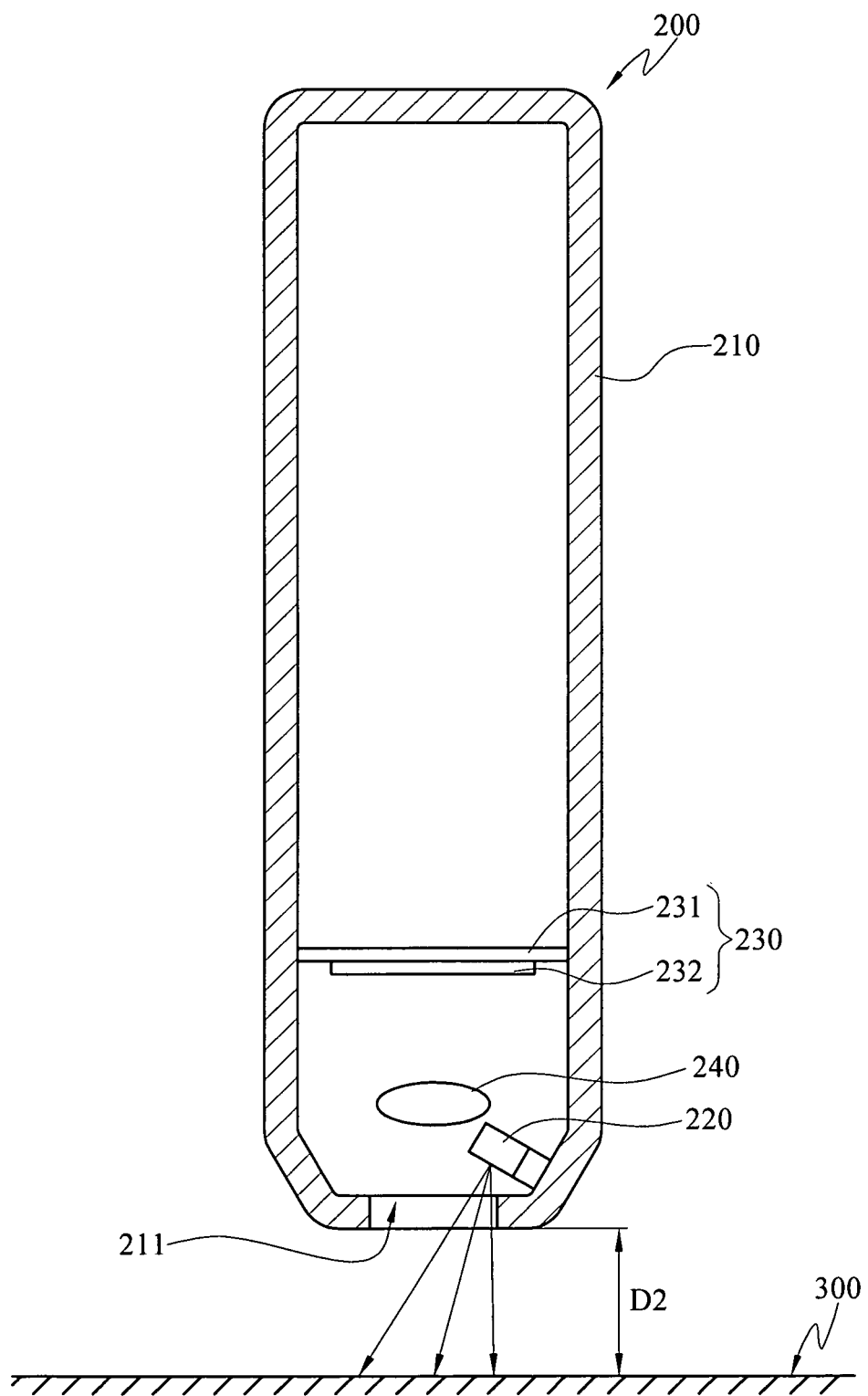
FIG. 3B is a schematic plan view according to the first embodiment of the present invention.

When the distance between the pen-like optical input device 200 and the working surface 300 is changed (such as a vertical change or inclining change), for example, a distance D1 is changed to a distance D2 as shown in FIGS. 3A and 3B, the optical signals are changed. Thus, the optical sensor 232 is enabled again to compare the optical signals of the reflected light rays of the multi-wavelength light source 220 once again, determines a wavelength region that is most suitable for the distance between the pen-like body 210 (or the multi-wavelength light source 220) of the pen-like optical input device 200 and the working surface 300 at this time, and enables the multi-wavelength light source 220 to emit a light ray in the corresponding wavelength region continuously, so that the optical sensor 232 obtains an optimal optical capturing effect and the pen-like optical input device 200 is enabled to position the cursor accurately (as each wavelength corresponds to an optimal imaging position/distance respectively).

Figure 3C:
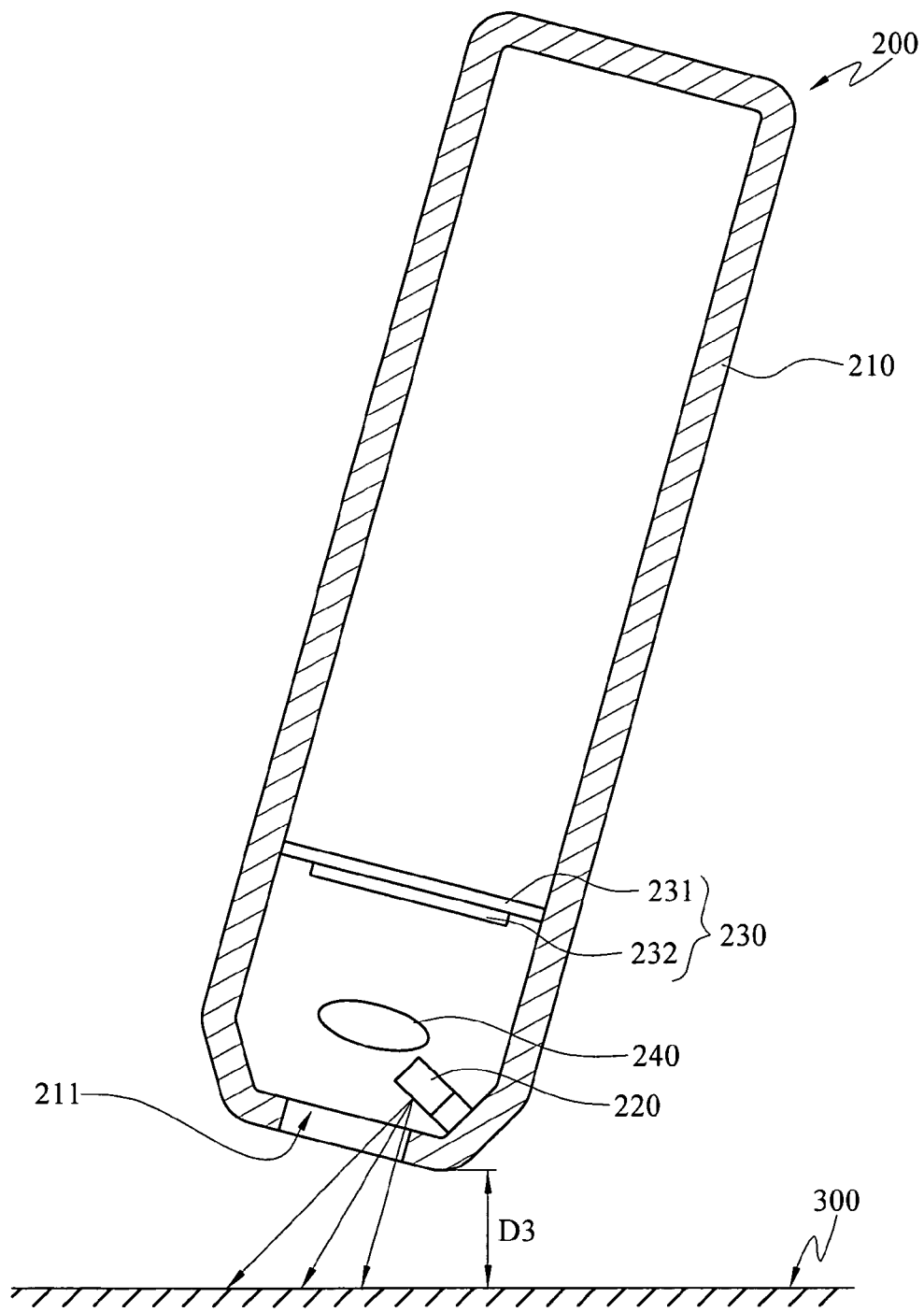
FIG. 3C is a schematic plan view according to the first embodiment of the present invention.

When the pen-like optical input device 200 inclines for an angle relative to the working surface 300, a distance in an inclining direction between the pen-like optical input device 200 and the working surface 300 is changed, for example, the distance D1 is changed to a distance D3 as shown in FIGS. 3A and 3C. The optical sensor 232 compares the optical signals of the reflected light rays of the multi-wavelength light source 220 once again, determines a wavelength region that is most suitable for the distance between the pen-like body 210 of the pen-like optical input device 200 and the working surface 300 at this time, and enables the multi-wavelength light source 220 to emit a light ray in the corresponding wavelength region continuously, such that the optical sensor 232 obtains an optimal optical capturing effect, and the pen-like optical input device 200 is enabled to position the cursor accurately.

It should be noted that, the D3 in this embodiment may also be zero. That is to say, when a hand gesture of the user is changed, different inclining angles are generated, and the distance in the inclining direction between the multi-wavelength light source 220 and the working surface 300 is changed accordingly. At this time, the original optical signals are changed, so that the optical sensor 232 compares the optical signals of the reflected light rays of the multi-wavelength light source 220 once again, determines a wavelength region that is most suitable for the distance between the pen-like body 210 of the pen-like optical input device 200 and the working surface 300 at this time, and enables the multi-wavelength light source 220 to emit a light ray in the corresponding wavelength region continuously.

Figure 4:
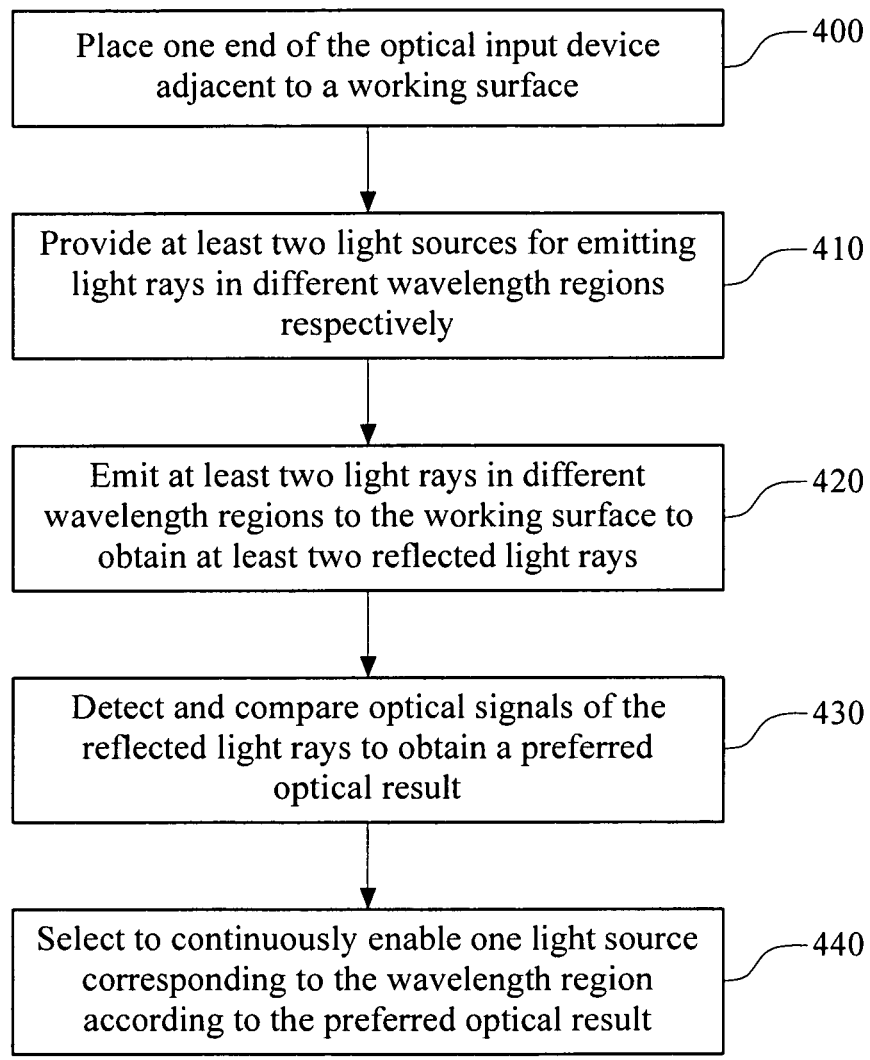
FIG. 4 is a flow chart of steps according to a second embodiment of the present invention.
Figure 5:
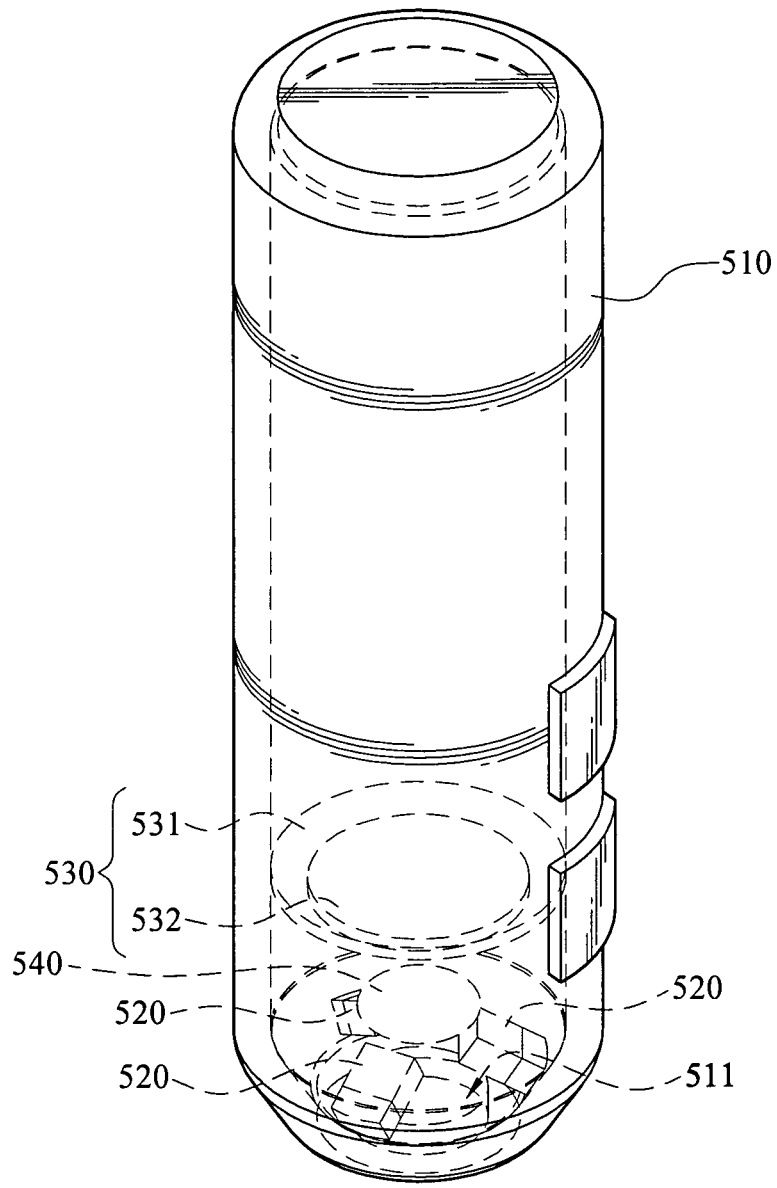
FIG. 5 is a schematic view according to the second embodiment of the present invention.
Figure 6A:
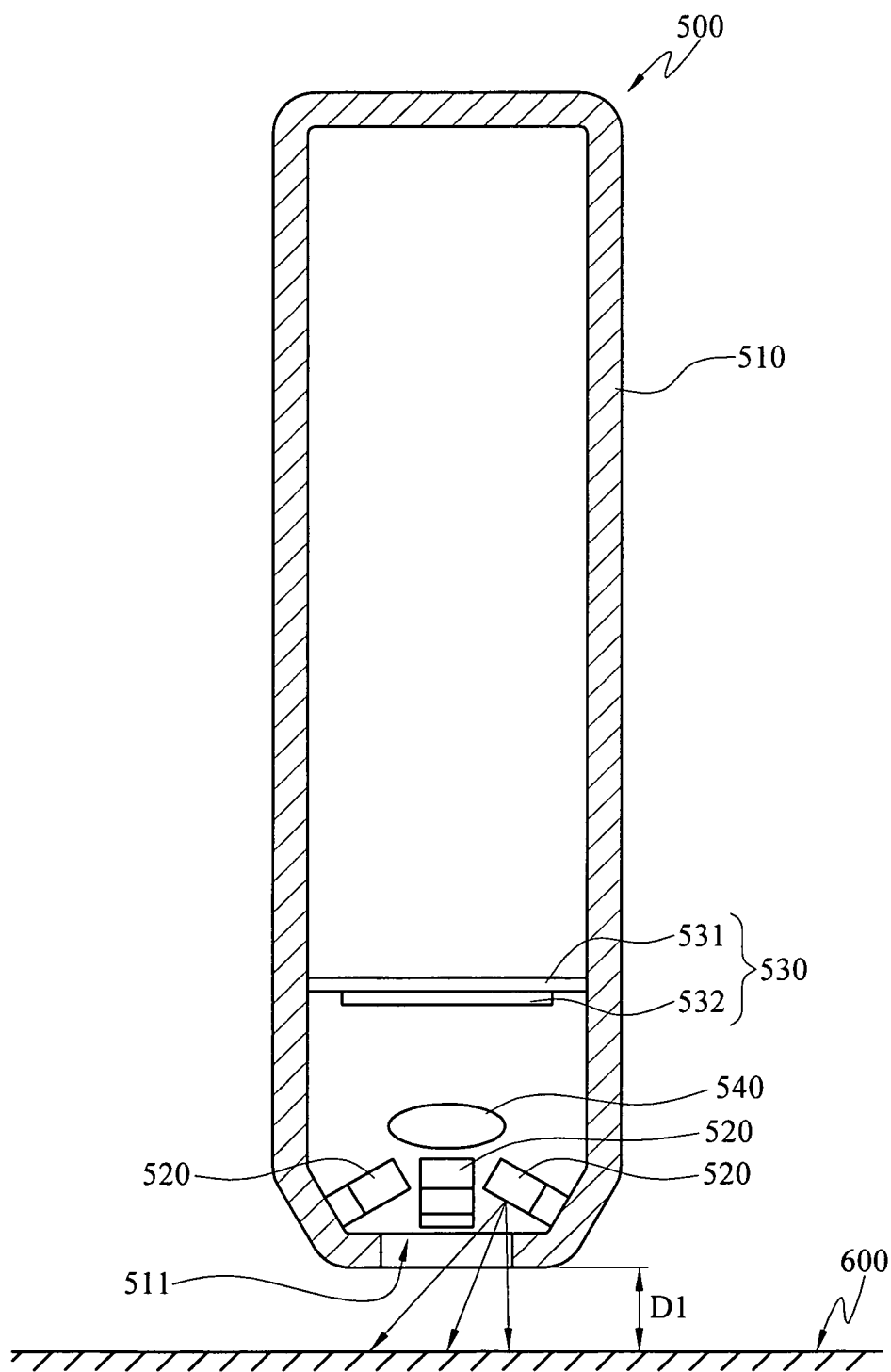
FIG. 6A is a schematic plan view according to the second embodiment of the present invention.

Referring to a flow chart of a second embodiment as shown in FIG. 4 and schematic views as shown in FIGS. 5 and 6A, a pen-like optical input device 500 according to a second embodiment of the present invention comprises a pen-like body 510, and at least two light sources 520, a light source sensing module 530, and a lens 540 disposed in the pen-like body 510. The pen-like body 510 is a hollow cylindrical structure, similar to a penholder shape. A light hole 511 is opened in a bottom surface of the pen-like body 510. The light source sensing module 530 comprises a circuit board 531 and an optical sensor 532. The optical sensor 532 is electrically disposed on the circuit board 531. Moreover, the light sources 520 emit light rays in different wavelength regions towards the light hole 511 of the pen-like body 510 respectively. The optical sensor 532 and the lens 540 are disposed at positions corresponding to the light hole 511. The lens 540 is located between the optical sensor 532 and the light hole 511.

Three light sources 520 disclosed in the present invention are disposed, and the light sources 520 may be similar light-emitting elements such as LEDs or laser diodes, so as to emit light rays having directional characteristics. The optical sensor 532 may be a CCD or a CMOS. However, the present invention is not limited to the embodiments disclosed in the present invention.

In a method for selecting a wavelength region of a pen-like optical input device according to a second embodiment of the present invention, one end of the pen-like optical input device 500 is placed adjacent to a working surface 600 (Step 400). At least two light sources 520 are first provided, in which the light sources 520 emit light rays in different wavelength regions respectively (Step 410). Next, light rays in different wavelength regions sequentially emitted by the light sources 520 pass through the light hole 511 of the pen-like body 510 to the working surface 600 (for example, a desktop), such that the working surface 600 generates at least two corresponding reflected light rays respectively (Step 420). The pen-like body 510 can be suspended on the working surface 600 as FIG. 6A, but not limited to that. The pen-like body 510 also can be attacked to the working surface 600.

The reflected light rays enter the pen-like body 510 through the light hole 511 and are refracted by the lens 540 into the optical sensor 532 of the light source sensing module 530. The optical sensor 532 detects optical signals represented by the reflected light rays and makes comparison through a circuit system (not shown) of the pen-like optical input device 500, so as to obtain a preferred optical result (Step 430). According to the preferred optical result, one light source 520 corresponding to the wavelength region is selectively enabled continuously (Step 440). The light sources 520 of the present invention increase the light intensity through focusing by the lens 540. The lens 540 disclosed in the present invention may be a lens of various configurations such as a double-convex lens, double-concave lens, or concave-convex lens. However, persons skilled in the art may select a lens with most preferred optical characteristics according to the practical using demand.

Specifically, when the pen-like optical input device 500 is operated in a manner of being vertical to the working surface 600 (as shown in FIG. 6A), the optical sensor 532 of the light source sensing module 530 detects and compares optical signals represented by the reflected light rays in different wavelength regions generated by the light sources 520, and determines a wavelength region that is most suitable for a distance between the pen-like body 510 (or the light source 520) of the pen-like optical input device 500 and the working surface 600. Finally, one corresponding light source 520 is continuously enabled.

Figure 6B:
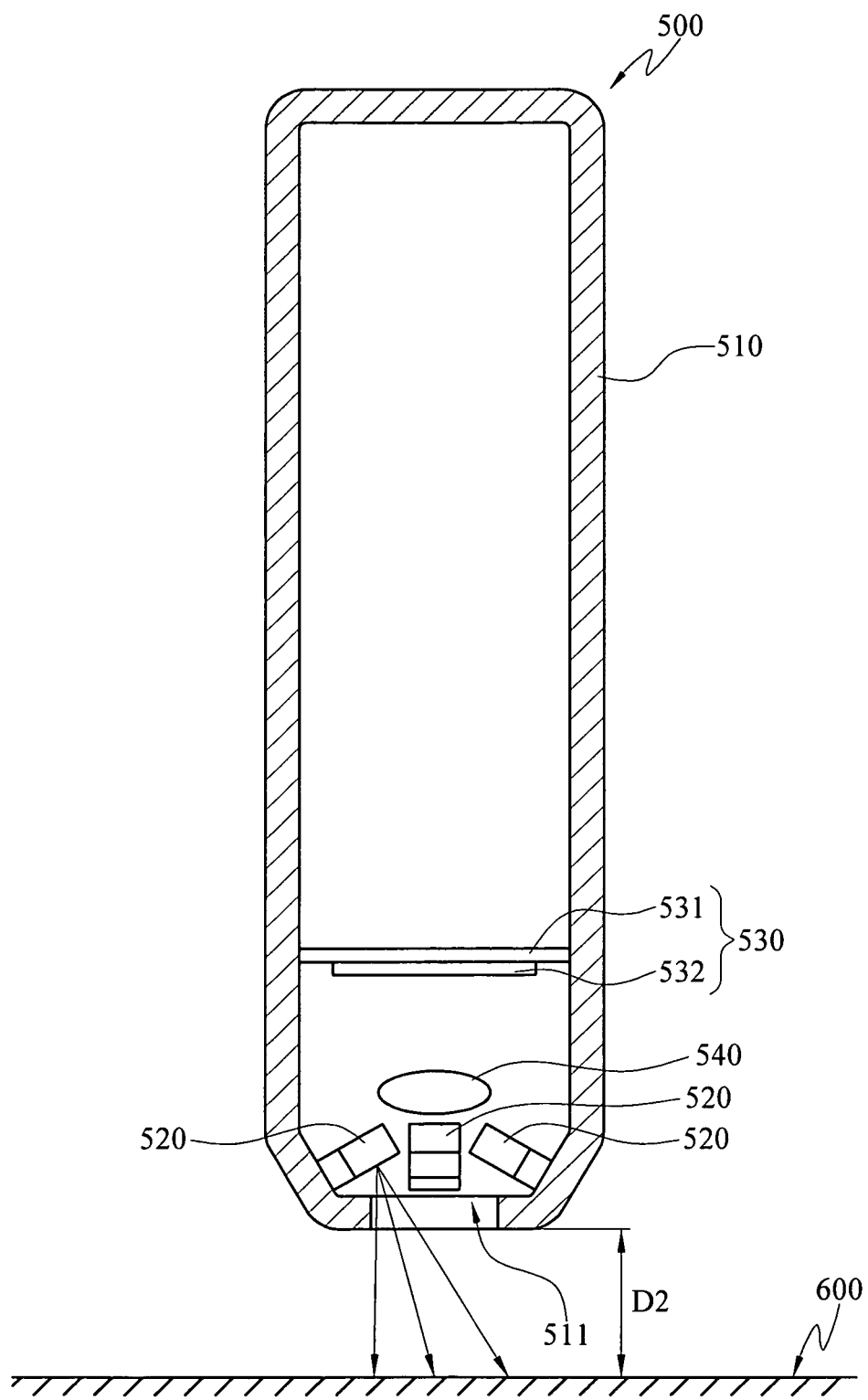
FIG. 6B is a schematic plan view according to the second embodiment of the present invention.

When the distance between the pen-like optical input device 500 and the working surface 600 is changed (such as a vertical change or inclining change), for example, a distance D1 is changed to a distance D2 as shown in FIGS. 6A and 6B, the optical signals are changed. Thus, the optical sensor 532 is enabled again to compare the optical signals of the reflected light rays of the light sources 520 once again, determines a wavelength region that is most suitable for the distance between the pen-like body 510 of the pen-like optical input device 500 and the working surface 600 at this time, and enables the corresponding light source 520, so that the optical sensor 532 obtains an optimal optical capturing effect and the pen-like optical input device 500 is enabled to position the cursor accurately.

When the pen-like optical input device 500 according to this embodiment inclines for an angle relative to the working surface 600, a distance between the pen-like body 510 (or the light source 520) of the pen-like optical input device 500 and the working surface 600 is correspondingly changed. At this time, the optical sensor 532 further compares the optical signals of the reflected light rays of the light sources 520 once again and enables the light source 520 that is most suitable for the wavelength region. It should be noted that, the D2 in this embodiment may also be zero and the pen-like optical input device 500 may be used in an inclining manner as shown in FIG. 3C. That is to say, when a hand gesture of the user is changed, different inclining angles are generated, and the distance in the inclining direction between the light source 520 and the working surface 600 is changed accordingly. The optical sensor 532 then compares the optical signals of the reflected light rays of the light sources 520 once again, determines a wavelength region that is most suitable for the distance between the pen-like body 510 of the pen-like optical input device 500 and the working surface 600 at this time, and enables the light source 520 to emit a light ray in the corresponding wavelength region continuously.

In the present invention, the multi-wavelength light source or the at least two light sources are adopted to emit light rays in different wavelength regions, and the light source sensing module detects optical signals generated by the light rays, so as to control the multi-wavelength light source/light sources to emit a light ray in a wavelength region most suitable for an operation status at that time correspondingly. When a distance or an inclining angle between the pen-like optical input device and the working surface is changed, the multi-wavelength light source/light sources may switch in real time to emit light rays in different wavelength regions, such that the optical input device is enabled to maintain an optimal optical sensing effect.

Therefore, the pen-like optical input device of the present invention can be successfully used on working surfaces with different surface conditions and used in situations of different distances or inclination angles between the pen-like optical input device and the working surface, such that the user is enabled to operate the pen-like optical input device at any place and any time without being restricted by the using environment. In addition, an appearance of the optical input device is designed into a pen shape, so that the optical input device can be easily carried along, and the user is enabled to hold and use the optical input device comfortably, which completely conforms to the ergonomics.

What is claimed is:

1. A specific wavelength selecting method for an optical input device, comprising:
    placing one end of the optical input device on a working surface;
    providing at least two light sources disposed within the optical input device, for emitting light rays having different wavelength regions respectively;
    emitting the at least two light rays having different wavelength regions to the working surface to obtain at least two reflected light rays respectively;
    detecting and comparing optical signals of the at least two reflected light rays, so as to obtain a preferred optical result, by:
        detecting a first of said at least two light rays to determine a first distance D1 between the working surface and a first of the two light sources, and
        detecting a second of said at least two light rays to determine a second distance D2 between the working surface and a second of the two light sources to the working surface,
    said preferred optical result being a distance change, wherein said distance change is a difference between said first distance D1 from said first of the two light sources to the working surface and said second distance D2 from said second of the two light sources to the working surface, said distance change (D2-D1) being caused by at least one of a changing angle and a vertical movement of the optical input device or light sources relative to the working surface; and
    selecting one of the at least two light sources to be enabled to continuously emit according to the preferred optical result.

2. The specific wavelength selecting method for the optical input device according to claim 1, wherein the optical signals of the at least two reflected light rays are detected by a light source sensing module.

3. An optical input device, comprising:
    a pen-like body;
    at least two light sources, disposed in the pen-like body, for emitting at least two light rays having different wavelength regions respectively, and emitting the at least two light rays to pass through the pen-like body to a working surface, such that the working surface generates at least two reflected light rays;
    a light source sensing module, disposed in the pen-like body, for receiving the at least two reflected light rays; and
    a lens, disposed in the pen-like body, for refracting the at least two reflected light rays into the light source sensing module;
    wherein the light source sensing module detects optical signals of the at least two reflected light rays and selects one of the at least two light sources to emit according to a distance change between the pen-like body or the light source and the working surface, said distance change being determined by:
        detecting a first of said at least two reflected light rays to determine a first distance D1 from the working surface to the pen-like body or light source, and
        detecting a second of said at least two reflected light rays to determine a second distance D2 from the working surface to the pen-like body or light source,
    wherein said distance change is a difference between said first distance D1 and said second distance D2, said distance change (D2-D1) being caused by a vertical movement of the pen-like body relative to the working surface, the light source sensing module receiving one of the at least two reflected light rays emitted from a selected one of the at least two light sources to generate a control signal.

4. The optical input device according to claim 3, wherein the light source sensing module comprises a circuit board and an optical sensor, and the optical sensor is electrically disposed on the circuit board and used for receiving the at least two reflected light rays.

5. The optical input device according to claim 3, wherein the pen-like body comprises a light hole, for the at least two light rays and the at least two reflected light rays to pass through the pen-like body.

* * * * *